United States Patent [19]

Mahling et al.

[11] Patent Number: 4,786,110

[45] Date of Patent: Nov. 22, 1988

[54] HINGE JOINT FOR SEATS OF MOTOR VEHICLES AND THE LIKE

[75] Inventors: Horst Mahling, Remscheid; Bernd Klüting, Radevormwald; Hans-Walter Busch, Hilden; Hans-Joachim Berghof, Remscheid, all of Fed. Rep. of Germany

[73] Assignee: Keiper Recaro GmbH & Co., Remscheid, Fed. Rep. of Germany

[21] Appl. No.: 70,923

[22] Filed: Jul. 8, 1987

[30] Foreign Application Priority Data

Jul. 16, 1986 [DE] Fed. Rep. of Germany ....... 3624018

[51] Int. Cl.⁴ .............................................. B60N 1/02
[52] U.S. Cl. ................................. 297/362; 192/8 R; 192/8 C
[58] Field of Search .............. 297/362; 192/8 R, 8 C, 192/7

[56] References Cited

U.S. PATENT DOCUMENTS

| | | | |
|---|---|---|---|
| 2,583,428 | 1/1952 | Houplain | 192/8 R |
| 3,110,380 | 11/1963 | Meyer et al. | 192/8 C |
| 4,336,618 | 12/1980 | West | 192/8 R |
| 4,533,027 | 8/1985 | Otani et al. | 192/8 C |
| 4,614,257 | 9/1986 | Harada et al. | 192/8 C |
| 4,651,854 | 3/1987 | Harada | 192/8 C |
| 4,708,392 | 11/1987 | Werner | 297/362 |

Primary Examiner—James T. McCall
Attorney, Agent, or Firm—Peter K. Kontler

[57] ABSTRACT

A hinge joint wherein one of the leaves is secured to a fixed part and the other leaf is secured to the pivotable back rest of a seat in motor vehicle and is pivotable with reference to the fixed leaf about the axis of a pintle which can be rotated by a hand wheel or a motor. The other leaf carries a braking member with a cylindrical or frustoconical internal surface which is engaged by the peripheral surface of a prestressed elastic split ring defining a gap for the projection of a blocking element which is affixed to the pintle and urges the split ring into stronger frictional engagement with the braking member when the back rest is acted upon to pivot the other leaf. A coupling device is secured to the hand wheel or to the motor to disengage the split ring from the braking member when the pintle is rotated by the hand wheel or by the motor. The end portions of the split ring flank the projection of the blocking element and are flanked by two protuberances of the coupling device.

20 Claims, 5 Drawing Sheets

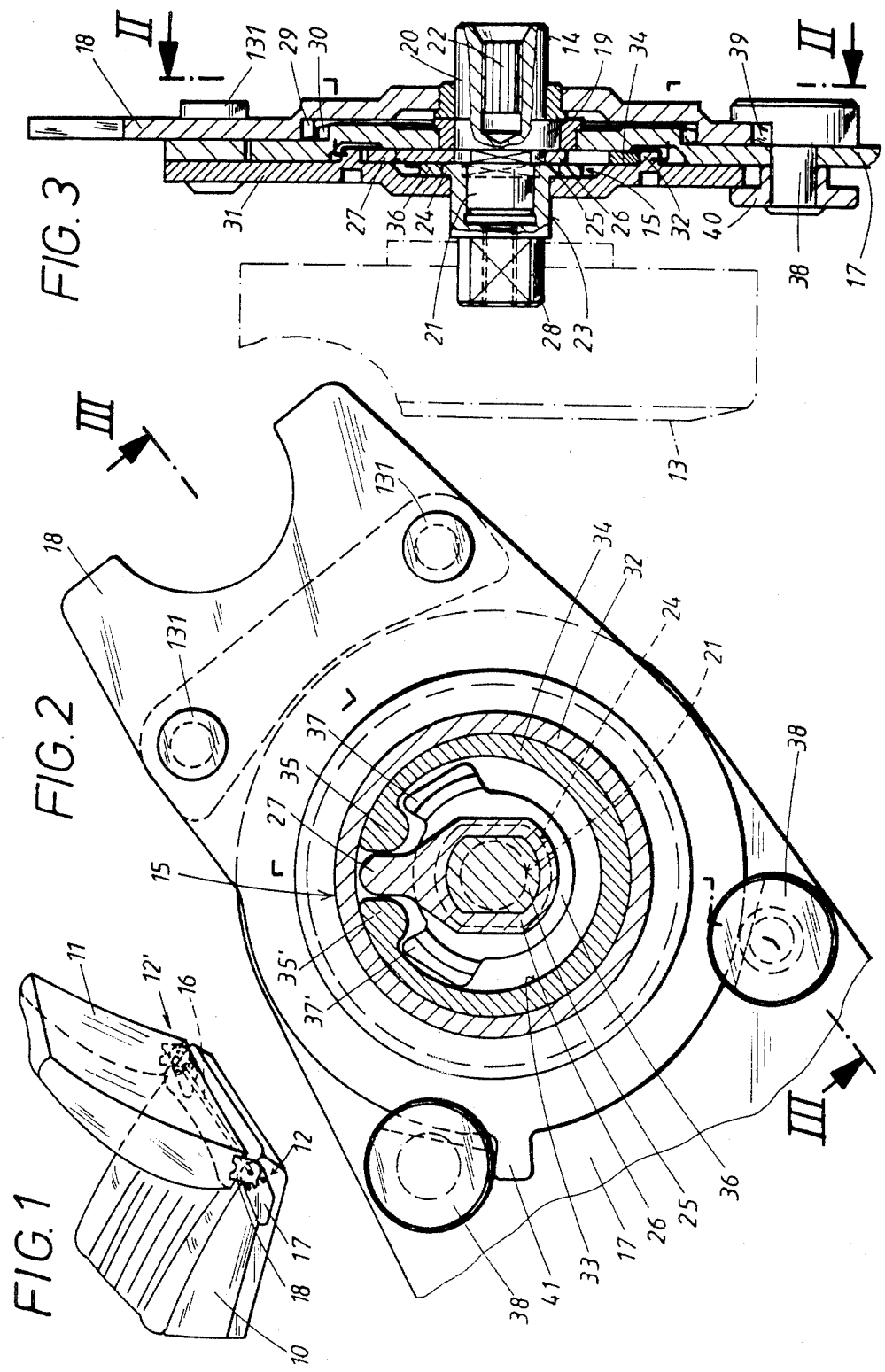

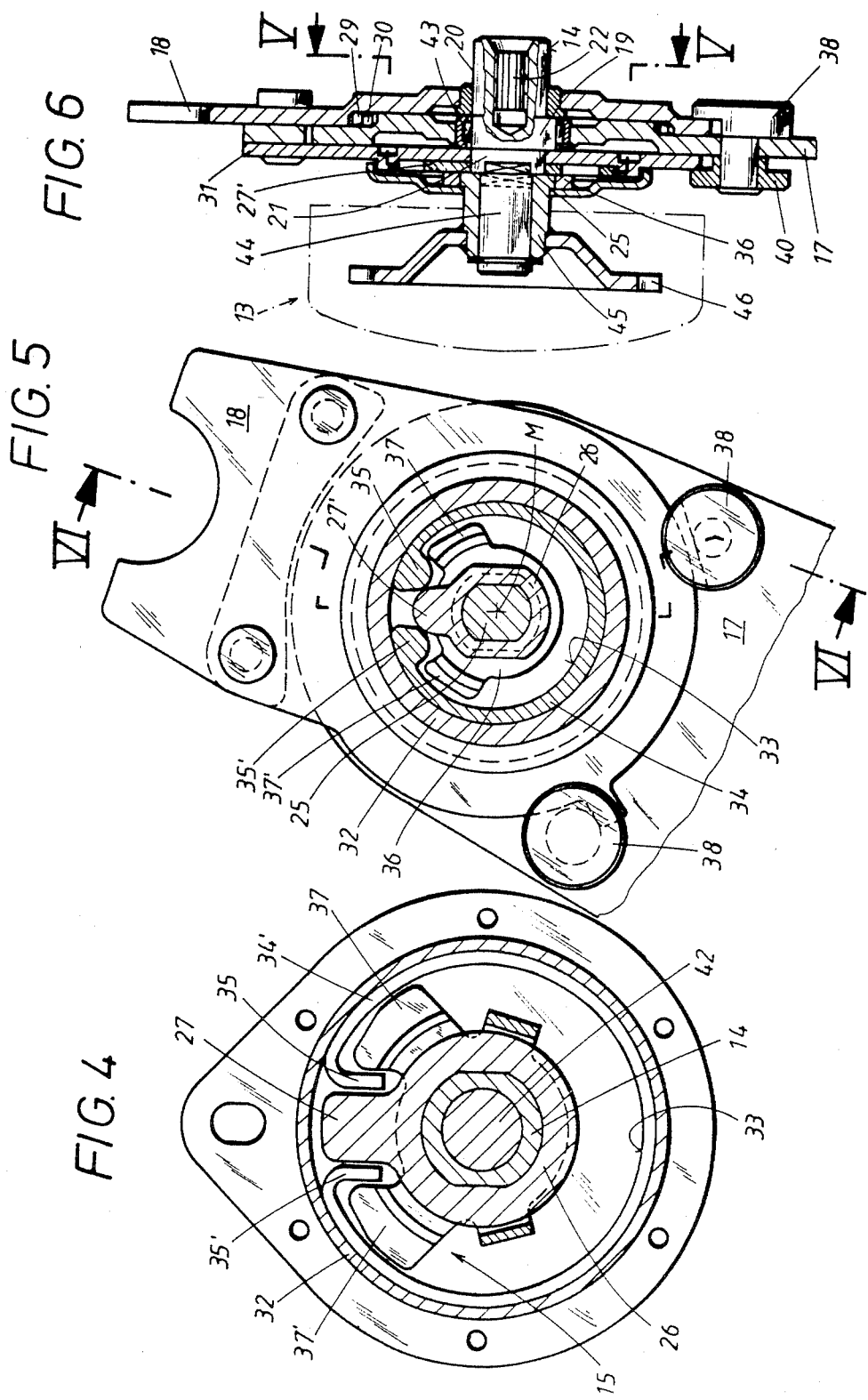

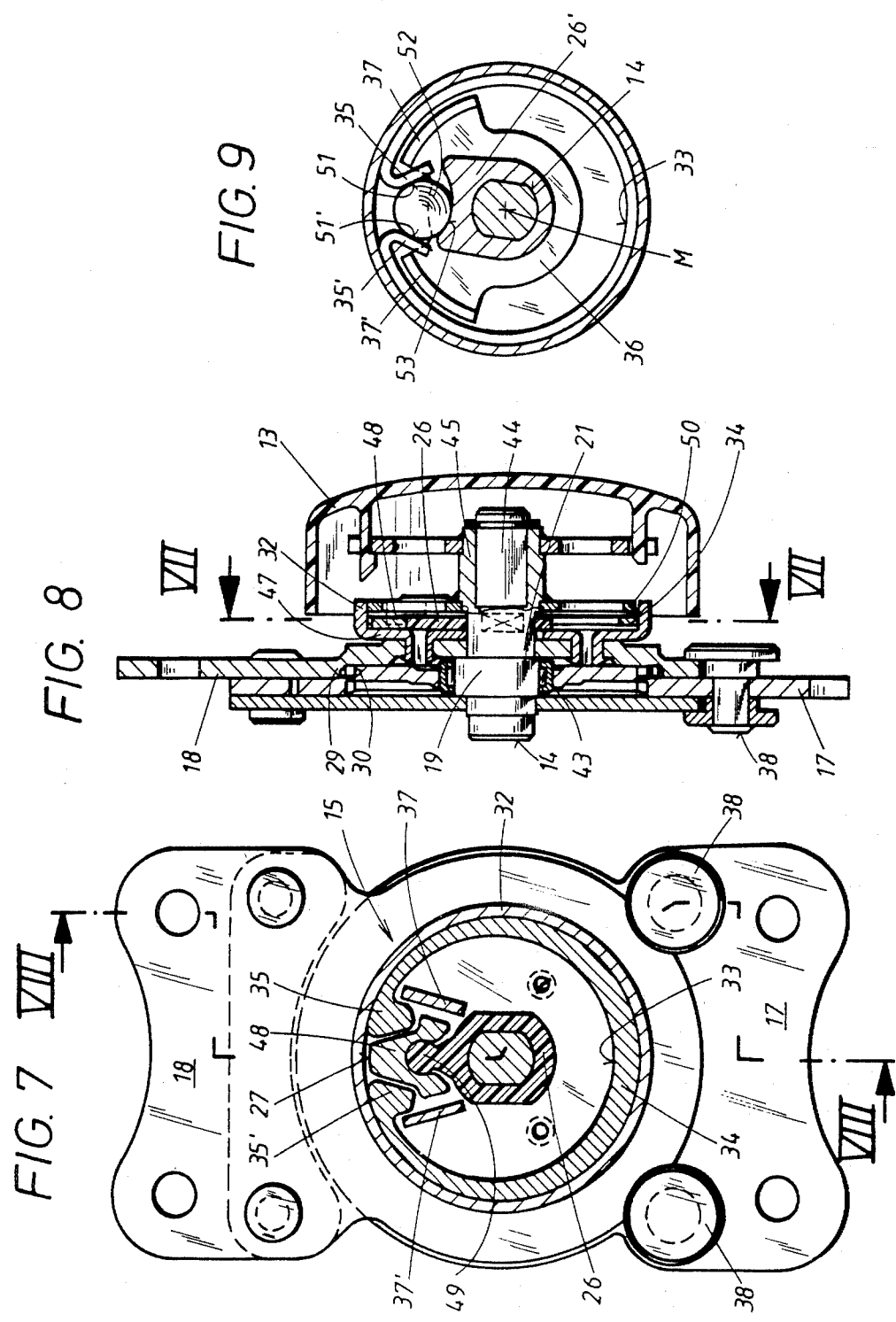

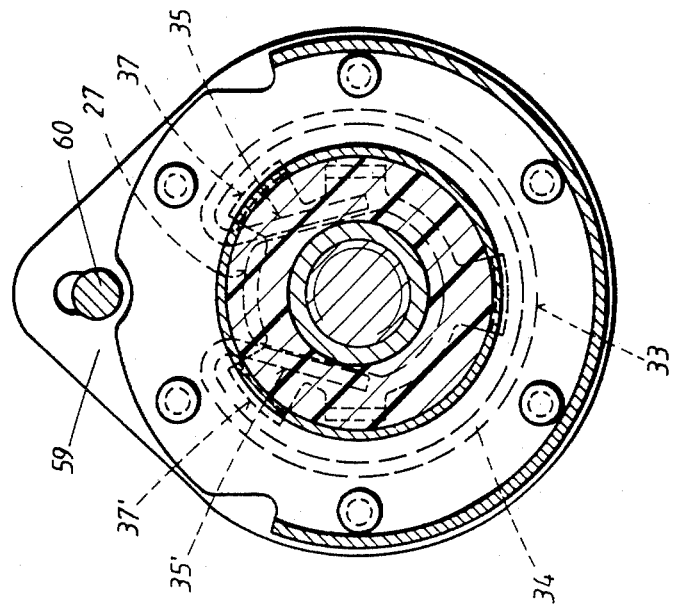
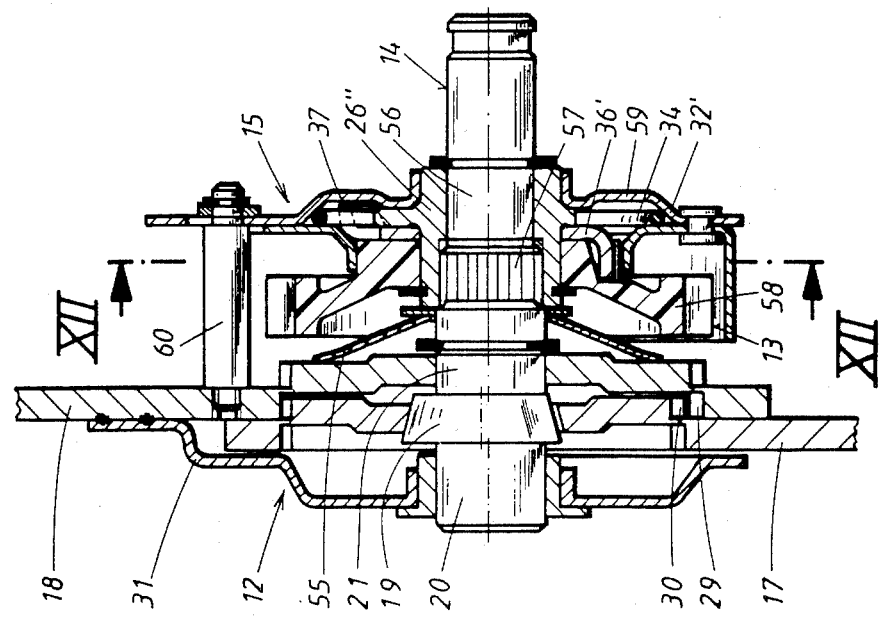

HINGE JOINT FOR SEATS OF MOTOR VEHICLES AND THE LIKE

CROSS-REFERENCE TO RELATED CASES

The hinge joint which is disclosed in the present application constitutes an improvement over and a further development of hinge joints which are disclosed in commonly owned U.S. Pat. No. 4,563,039 to Jörg, in commonly owned copending patent application Ser. No. 881,195 filed July 2, 1986 by Walk et al., in commonly owned copending patent application Ser. No. 881,225 filed July 2, 1985 by Werner et al., and in commonly owned copending patent application Ser. No. 930,252 filed Nov. 12, 1986.

BACKGROUND OF THE INVENTION

The invention relates to improvements in hinge joints in general, and more particularly to improvements in hinge joints which can be used to permit pivotal movements of selected parts of seats relative to each other as well as to hold such parts in selected positions when the adjustment is completed.

It is known to provide the seats in motor vehicles (particularly the driver's seat and the seat next to the driver's seat) with hinge joints which enable the user of the seat or another person to change the inclination of the back rest with reference to the body-supporting or body-carrying part of the seat. The hinge joint includes a first section or leaf which is affixed to the body-supporting part, a second section or leaf which is affixed to the back rest, a shaft which acts as a pintle and articulately connects the second section to the first section, and a locking unit which can hold the second section in a selected angular position so that the inclination of the back rest cannot be changed in response to direct application thereto of a force which urges the second section to pivot with reference to the first section. In many instances, one of the sections has an internal gear which mates with a spur gear of the other section, and the number of teeth in the internal gear exceeds the number of teeth in the spur gear. The shaft of the hinge joint has an eccentric portion which acts as a planet carrier for the spur gear. Such transmissions are known as tumble or wobble transmissions and they produce a self-locking action, in part between the mating teeth of the gears and in part between the spur gear and the eccentric portion of the shaft. The reliability of self-locking action is affected if it is desired to reduce the resistance which the shaft offers to rotation by a hand wheel or the like, particularly by inserting a needle bearing or another antifriction bearing between the eccentric portion of the shaft and the part which surrounds such eccentric portion. When the vehicle is in motion, the back rest of the seat is subjected to continuously varying stresses, partly due to the weight of the person occupying the seat and partly due to unevennesses of the road surface. Thus, the transmission is under constant stress which, in time, leads to at least some changes in the inclination of the back rest, namely in a direction to increase the inclination and to possibly cause discomfort to the occupant. This necessitates repeated adjustments of the inclination of the back rest.

German Auslegeschrift No. 24 46 181 discloses a hinge joint wherein a hand wheel is used to rotate the shaft, and a safety locking device is installed between the hand wheel and the shaft to prevent unintentional angular displacements of the section which carries the back rest. The locking device employs a so-called wrap spring clutch of the type disclosed, for example, in German Offenlegungsschrift No. 1 580 017. A drawback of a wrap spring clutch is that its convolutions occupy a substantial amount of space in the axial direction of the shaft. Therefore, such hinge joint reduces the effective width of the seat and affects the comfort of the occupant.

OBJECTS AND SUMMARY OF THE INVENTION

An object of the invention is to provide a novel and improved hinge joint which can be used to articulately connect parts of seats of motor vehicles and is constructed and assembled in such a way that it occupies little room but is nevertheless capable of retaining the parts in selected positions for any desired interval of time.

Another object of the invention is to provide a hinge joint of the above outlined character with a novel and improved locking device which ensures that the sections of the joint remain in selected positions until and unless the occupant of the seat or another person decides to change the positions of the sections.

A further object of the invention is to provide a novel and improved brake which can be used in the locking device.

An additional object of the invention is to provide a hinge joint wherein the resistance of the sections to changes of their mutual positions increases if the sections are acted upon with a progressively increasing force in a direction to change the orientation of one section relative to the other section in a manner other than by way of rotating the shaft through the medium of a hand wheel, a lever or a motor which must be started by a person.

Still another object of the invention is to provide a novel and improved method of enhancing the resistance of components of the hinge joint to any changes of their mutual positions other than in the prescribed manner, such as by a hand wheel or a motor.

A further object of the invention is to provide an adjustable seat, particularly for use in motor vehicles, which embodies one or more hinge joints of the above outlined character.

Another object of the invention is to provide a hinge joint which enables a person to pivot the movable section to a practically infinite number of different positions with reference to the other section and to reliably hold the movable section in any one of such large number of selected positions regardless of the condition of the road and/or the activities of the occupant of the seat if the hinge joint is used in the seat of a motor vehicle.

A further object of the invention is to provide a relatively simple, compact and inexpensive hinge joint which can be manipulated by hand or by a motor and which takes up little room in or on the seat of a motor vehicle.

Another object of the invention is to provide a hinge joint wherein the locking device can compensate for manufacturing tolerances of its component parts without affecting its reliability and/or useful life.

The invention is embodied in a hinge joint which can be used with advantage to change the mutual positions of two parts of a seat in a motor vehicle (i.e., to change the inclination of the back rest with reference to the body-supporting or carrying portion of the seat). The improved hinge joint comprises a first section which can be said to constitute one leaf of the hinge joint and is connectable to the first part of a seat (particularly to the aforementioned body-supporting or carrying portion of the seat), a second section or leaf which is connectable to the second part of a seat, a shaft (which can be said to constitute the pintle of the hinge joint) which pivotably mounts the second section on the first section, means (e.g., a hand wheel or a motor) for rotating the shaft, a transmission (e.g., a pair of mating internal and external gears having different numbers of teeth) which is interposed between the first and second sections and is operative to change the position of the second section with reference to the first section in response to rotation of the shaft, and novel and improved means for locking the second section in a selected position with reference to the first section. In accordance with a feature of the invention, the locking means includes a braking member which is provided on one of the sections and has a cylindrical or frustoconical internal surface, a resilient brake shoe including a radially expendible and contractible ring which is normally in frictional engagement with the internal surface of the braking member and has two motion transmitting portions, a coupling device which is operatively connected with the rotating means and includes a disengaging portion which cooperates with the motion transmitting portions of the ring to reduce friction between the ring and the braking member in response to rotation of the shaft by the rotating means, and a blocking element which is provided on the shaft and has an engaging portion cooperating with the motion transmitting portions of the ring to urge the ring against the internal surface of the braking member in response to application to the second section of a force which tends to change the positions of the second section and of the shaft relative to the first section.

The ring is preferably flat and is preferably installed in the braking member in prestressed condition so that it normally bears against the internal surface of the braking member. The motion transmitting portions of the ring preferably extend substantially radially inwardly and away from the internal surface of the braking member. In accordance with a presently preferred embodiment, the ring is a split ring and the motion transmitting portions of the ring are the end portions of the split ring; such end portions define a gap which can receive a projection provided on the blocking element and constituting or including the aforementioned engaging portion. The disengaging portion can include two protuberances which are provided on the coupling device and flank the end portions of the split ring.

The ring can have a polygonal (particularly a square or rectangular) cross-sectional outline. Alternatively, the ring can constitute a length of wire having a constant diameter from end to end and having its ends bent inwardly to constitute the aforementioned motion transmitting portions; such wire-like ring can be used with advantage if the braking member is provided with a frustoconical internal surface.

The end portions of the ring can have convex surfaces which flank a convex surface on the projection which constitutes the engaging portion of the blocking element. The distance between the convex surfaces of the end portions of the ring and the axis of the shaft is preferably only slightly less than the distance between the radially outermost portion of the convex surface of the projection and the axis of the shaft. At least one of the convex surfaces (e.g., the convex surface of the projection on the blocking element) can extend along an arc of approximately 180 degrees.

The blocking element can include a main portion which is mounted on the shaft and a fulcrum which is provided on the main portion for the engaging portion (as mentioned above, the engaging portion can constitute a projection extending into the gap between the end portions of the split ring). The pivot axis which is defined by the fulcrum is or can be parallel to the axis of the shaft. The projection can rock on the fulcrum back and forth with reference to the main portion of the blocking element.

Alternatively, the blocking element can include a main portion which is provided on the shaft and has a concave seat facing the gap between the end portions of the split ring. The engaging portion of such blocking element is a rolling element which can roll along the concave seat of the main portion and is flanked by the end portions of the split ring; such end portions are preferably provided with surfaces which extend tangentially of and are in contact with the rolling element. The latter can constitute a flat disc.

The entire locking means can constitute a prefabricated module which is mounted on an extension of the shaft. The module can even include the aforementioned means for rotating the shaft.

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic perspective view of a seat for use in a motor vehicle wherein the back rest is pivotably connected to the body-supporting part by two hinge joints at least one of which embodies the present invention;

FIG. 2 is an enlarged partly elevational and partly transverse sectional view of a hinge joint which embodies one form of the invention, the locking means for the back rest being shown in operative position and the section being taken in the direction of arrows as seen from the line II—II in FIG. 3;

FIG. 3 is a sectional view as seen in the direction of arrows from the line III—III of FIG. 2;

FIG. 4 is a fragmentary sectional view similar to that of FIG. 2 but showing modified locking means for the pivotable section of the hinge joint;

FIG. 5 is a view similar to that of FIG. 2 but showing a third hinge joint, the section being taken along the line V—V in FIG. 6 as seen in the direction of arrows;

FIG. 6 is a sectional view as seen in the direction of arrows from the line VI—VI of FIG. 5;

FIG. 7 is a sectional view somewhat similar to that of FIG. 2 but showing a fourth hinge joint, the section being taken along the line VII—VII of FIG. 8 as seen in the direction of arrows;

FIG. 8 is a sectional view as seen in the direction of arrows from the line VIII—VIII of FIG. 7;

FIG. 9 is a sectional view similar to that of FIG. 7 but showing a portion of a fifth hinge joint constituting a modification of the hinge joint which is shown in FIGS. 7 and 8;

FIG. 11 is a sectional view similar to that of FIG. 3 but showing a seventh hinge joint wherein the locking means and the means for rotating the shaft constitute a module which is mounted on an extension of the shaft; and FIG. 12 is a sectional view as seen in the direction of arrows from the line XII—XII of FIG. 11.

DESCRIPTION OF THE PREFERRED EMBODIMENTS

Figure 10:
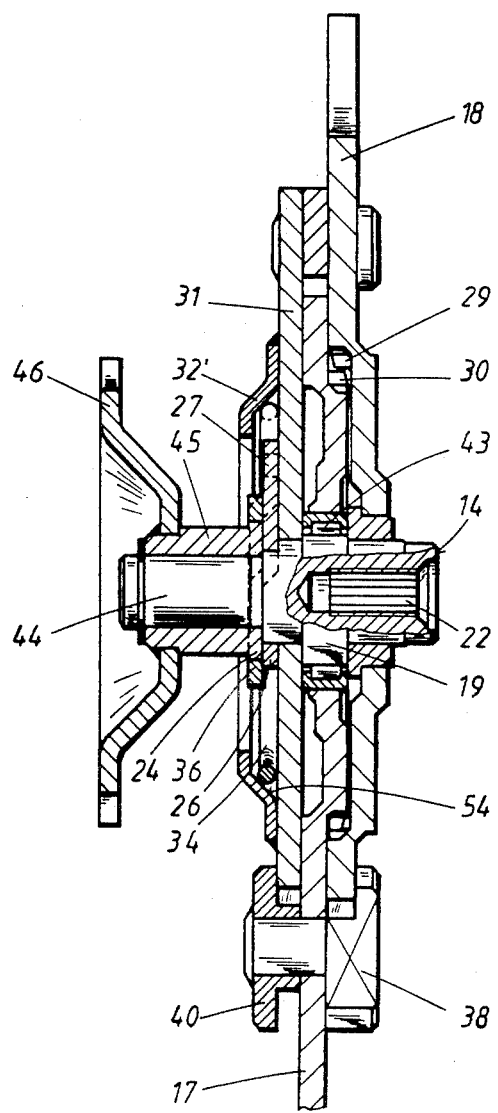
FIG. 10 is a sectional view similar to that of FIG. 3 but showing a sixth hinge joint wherein a split ring which is made of wire is in contact with a frustoconical surface of the associated braking member.

FIG. 1 shows a seat for use in a motor vehicle. The seat comprises a body supporting part 10 and a second part or back rest 11 which is pivotable with reference to the part 10 and can be fixed in a selected position of inclination. The means for articulately connecting the part 10 with the back rest 11 comprises two hinge joints 12, 12' each of which is or can be constructed, assembled and operated in accordance with the present invention. The left-hand joint 12 is shown in greater detail in FIGS. 2 and 3; it comprises a hand wheel 13 which constitutes a means for rotating a horizontal shaft 14 and is adjacent to and accessible at the left-hand side of the seat (this hand wheel is not referenced in FIG. 1). The hinge joint 12 further comprises a first section or leaf 17 which is fixedly secured to the part 10 and a second section or leaf 18 which is fixedly secured to and can pivot jointly with the part or back rest 11 about the axis of the shaft 14 when the operator so desires. The invention actually resides in improvements in a device 15 which serves to releasably lock the section 18 in a selected angular position with reference to the section 17 in such a way that the operator can readily change the inclination of the back rest 11 by simply rotating the hand wheel 13 in a desired direction but the angular position of the back rest remains unchanged if a force is applied to the back rest and/or section 18 instead of to the hand wheel.

It is within the purview of the invention to provide a second hand wheel for the hinge joint 12'. However, it is normally preferred to synchronize the movements of the pivotable sections (including the section 18 of the joint 12 and the corresponding section of the joint 12') by means of a connecting or motion transmitting rod 16 between them. The connecting rod 16 is preferably designed to turn the shaft of the hinge joint 12' in response to turning of the shaft 14 of the hinge joint 12 by the hand wheel 13.

The shaft 14 constitutes the pintle of the hinge joint 12 and includes two coaxial or concentric portions 20, 21 flanking an eccentric portion 19. The portion 20 is nearest to the hinge joint 12' and has an axial blind bore 22 surrounded by an annulus of internal teeth and tooth spaces for complementary tooth spaces and teeth on the respective end portion of the connecting rod 16 to thus ensure that the rod 16 is compelled to share all angular movements of the shaft 14. The shaft portion 21 faces away from the hinge joint 12' and is surrounded by a sleeve 23 having several portions with different outer diameters. One of these portions is a collar 24 which is provided with two parallel flats (see FIG. 2) and surrounds a motion receiving member 25 of the shaft 14 between its portions 19 and 21. The motion receiving member 25 of the shaft 24 is surrounded by and can turn a blocking element 26 which forms part of the locking device 15. A radially outwardly extending projection 27 of the blocking element 26 constitutes an engaging portion of this element and can be bounded in part by a convex surface (see FIG. 2).

The sleeve 23 is rotatable on the shaft portion 21, and its leftmost portion 28 (as seen in FIG. 3) constitutes a stud which is non-rotatably received in the hub of the hand wheel 13 so that the sleeve 23 shares all angular movements of the hand wheel.

The shaft portion 20 is surrounded by the section 18 of the hinge joint 12 (a suitable bearing sleeve can be interposed between the shaft portion 20 and the surface surrounding the opening in the section 18) in such a way that the section 18 can turn on the shaft 14. The section 18 has an internal gear 29 mating with an external gear 30 of the section 17. The number of teeth forming the gear 29 equals m+n wherein m is the number of teeth which form the gear 30 and n is a whole number including one. The diameter of the dedendum circle of the gear 29 exceeds the diameter of the addendum circle of the gear 30 at least by the radial dimension of one tooth.

The section 18 is rigidly connected with a dished panel or cheek 31 in such a way that the section 17 is located between the panel 31 and the section 18. An opening of the panel 31 surrounds the sleeve 23 and this panel includes a shallow cylindrical braking member 32 whose axis is located on the axis of the shaft 14 and which an be formed in a stamping, upsetting or like machine as an axially offset portion of the main part of the panel 31. The cylindrical internal surface of the braking member 32 is engaged by the external surface of a radially expandible resilient brake shoe 33 which, in the embodiment of FIGS. 2–3, includes a split ring 34 having two end portions or motion transmitting portions 35, 35' defining a gap for the projection or engaging portion 27 of the blocking element 26. The motion transmitting portions 35, 35' have convex surfaces which flank the projection 27, and these motion transmitting portions extend radially inwardly, i.e., in a direction away from the cylindrical internal surface of the braking member 32.

The motion transmitting portion 35, 35' are flanked by two protuberances 37, 37' constituting the disengaging portion of a coupling device 36 which is non-rotatably mounted on the non-circular collar 24 of the sleeve 23. The coupling device 36 is located in a plane which is adjacent the plane of the split ring 34 of the brake shoe 33; however, the protuberances 37, 37' of the coupling device 36 are bent axially of the shaft 14 so that they are coplanar with the motion transmitting portions 35, 35' of the split ring 34 and with the projection 27 of the blocking element 26.

The split ring 34 has a polygonal cross-sectional outline (see FIG. 3), preferably a square or rectangular cross-sectional outline. The configuration of the split ring 34 is preferably such that its radial dimension increases gradually all the way from the motion transmitting portions 35, 35' to a location diametrically opposite the gap between the portions 35, 35' (this can be readily seen in FIG. 2). Such configuration enhances the deformability of the split ring 34 in the region of the motion transmitting portions 35 and 35' while reinforcing that (central) portion which must take up repeated and substantial flexing stresses.

The panel 31 is fixedly secured to the section 18 by two rivets 131 which are shown in the upper right-hand portion of FIG. 2 and one of which is also shown in FIG. 3. In addition, the hinge joint 12 comprises means for properly confining the section 17 between the section 18 and the panel 31 in the region where the section 17 is affixed to the part 10 of the seat. Such confining means comprises two rivet-shaped distancing elements 38 which are spaced apart from each other in the circumferential direction of the shaft 14. The right-hand head of each distancing element 38 (as seen in FIG. 3) overlies the adjacent marginal portion 39 of the section 18, and the other head 40 of each distancing element 38 is a collar which overlies the adjacent marginal portion of the panel 31. The marginal portion 39 of the section 18 is provided with a tooth-shaped projection or finger 41 which is dispose between the distancing elements 38 and determines the extent of angular movability of the section 18 and panel 31 (with braking member 32) relative to the section 17. The extent of angular movability of the section 18 relative to the section 17 is further determined by the selected distance of one of the distancing elements 38 from the other distancing element (as seen in the circumferential direction of the shaft 14) and by the width of the finger 41.

FIGS. 2 and 3 show the section 18 in an end position in which the section 18 maintains the respective part 11 of the seat in a position of maximum rearward inclination with reference to the part 10, i.e., the finger 41 of the section 18 abuts the left-hand distancing element 38 of FIG. 2. In order to reduce the extent of rearward inclination of the back rest 11 and section 18, the occupant of the seat including the parts 10, 11 (or another person) rotates the hand wheel 13 in a counterclockwise direction (as seen in FIG. 2) whereby the protuberance 37 of the coupling device 36 (which shares the angular movement of the hand wheel 13) engages the adjacent motion transmitting portion 35 of the split ring 34 to pull the neighboring part of the peripheral surface of the split ring away from the cylindrical internal surface of the braking member 32 on the panel 31, i.e., on the section 18. Such partial disengagement of the peripheral surface of the split ring 34 from the internal surface of the braking member 32 enables the shaft 14 to rotate with the hand wheel 13. The eccentric portion 19 of the shaft 14 thereby causes the locus where the teeth of the external gear 30 on the section 17 mate with the teeth of the internal gear 29 on the section 18 to travel about the axis of the shaft 14. Each revolution of the shaft 14 entails a change of inclination of the section 18, panel 31 and part 11 by the width of a tooth on the internal gear 29. The operator continues to rotate the hand wheel 13 in a counterclockwise direction until the inclination of the part 11 with reference to the part 10 of the seat is changed to the desired extent. When the operator ceases to positively turn the hand wheel 13, the prestressed split ring 34 of the brake shoe 33 immediately expends and its entire peripheral surface moves back into pronounced frictional engagement with the internal surface of the braking member 32. The thus arrested motion transmitting portions 35, 35' of the split ring 34 then lock the projection 27 of the blocking element 26 so that the section 18 is reliably held in the newly selected angular position. It will be recalled that the blocking element 26 is non-rotatably connected with the shaft 14. If a force is applied directly to the back rest 11, the force is taken up by the shaft 14 which transmits the force to the blocking element 26 whereby the projection 27 of the blocking element 26 bears against the adjacent motion transmitting portion 35 or 35' of the split ring 34 (depending upon the direction of action of the projection 27) so that the peripheral surface of the split ring 34 is moved into stronger frictional engagement with the internal surface of the braking member 32. Each and every angular displacement of the section 18 and back rest 11 necessitates rotation of the hand wheel 13 in a clockwise or in a counterclockwise direction (which entails at partial disengagement of the split ring 34 from the braking member 32 by the protuberance 37' or 37 of the coupling device 36). The projection 27 of the blocking element 26 reacts to the application of forces in a clockwise or in a counterclockwise direction to thereby urge the split ring 34 into stronger frictional engagement with the braking member 32 by way of the motion transmitting portion 35 or 35'.

An advantage of the hinge joint 12 is that the space requirements of the locking or safety device 15 (as considered in the axial direction of the shaft 14) are a small fraction of the space requirements of conventional locking devices which employ the aforediscussed wrap spring clutches. This is due to the fact that the brake including the member 32 and the split ring 34 is a flat body whose axial length need not appreciably exceed the thickness of the brake shoe 33. The space requirements of such split ring are incomparably smaller than those of the multiple-convolution spring which is used in the clutches of the aforediscussed references. Moreover, a minute displacement of the motion transmitting portion 35 or 35' suffices to disengage the split ring 34 from the braking member 32 so that the shaft 14 can be rotated by the hand wheel 13 with a minimum of effort. This renders it possible to use a compact coupling device 36 as well as to further reduce the combined space requirements of the split ring 34 and coupling device.

The split ring 34 can be replaced with a circumferentially complete brake shoe which has an elastic portion so as to allow for movement of the motion transmitting portions 35, 35' toward or away from the internal surface of the braking member 32. The utilization of a brake shoe which constitutes or includes a split ring is preferred at this time because the split ring is simpler, less expensive and at least as reliable as a circumferentially complete brake shoe with an elastic portion.

The illustrated split ring 34 exhibits the advantage that it can be cut out of a plate-like blank of metallic material (such as spring steel) with a very high degree of accuracy. This renders it possible to place the projection 27 into immediate proximity of the motion transmitting portions 35, 35' and to place the protuberances 37, 37' into immediate proximity of the respective motion transmitting portions to thus ensure that the locking device 15 will react without any or with a minimum of delay. Moreover, such accurate positioning can be achieved at a low cost because the split ring 34 can be cut out of a sheet metal blank with a very high degree of accuracy.

FIG. 4 shows a portion of a modified hinge joint wherein the brake shoe 33 includes a split ring 34' of wire having a circular cross section and a constant diameter from end to end. The end portions 35 and 35' of the split ring 34' are bent radially inwardly to constitute the motion transmitting portions of the brake shoe and to define a gap for the radial projection (engaging portion) 27 of the blocking element 26. The latter is non-rotatably mounted on the shaft 14. The shaft 14 is hollow and receives an extension 42 which is rotatable therein and is rigid with the coupling device. The coupling device has a disengaging portion including two protuberances 37, 37' which flank the motion transmitting portions 35, 35' of the split ring 34' and cooperate therewith in the same way as described in connection with the hinge joint 12 of FIGS. 2 and 3.

The split ring 34' is less expensive than the split ring 34 of the hinge joint 12 which is shown in FIGS. 1 and 2. Moreover, the inclination of its motion transmitting portions 35 and 35' can be adjusted in a simple way.

All reference characters which are shown in FIG. 4 and in FIGS. 5–12 but are not specifically mentioned denote parts which correspond to similarly referenced parts of the hinge joint 12 of FIGS. 2–3.

FIGS. 5 and 6 show certain details of a third hinge joint which employs a modified locking device for the section 18. The brake shoe 33 includes a split ring 34 which is similar to or identical with the split ring 34 of FIGS. 2 and 3, i.e., it also comprises two motion transmitting portions 35, 35' bounded by convex surfaces and flanking a relatively short projection or engaging portion 27' of the blocking element 26. The radially outermost portion of the convex peripheral surface of the projection 27' extends only slightly outwardly of and beyond the radially innermost points of the motion transmitting portions 35 or 35' of the split ring 34. In other words, the distance of the radially outermost point of the projection 27' from the axis M of the shaft 14 only slightly exceeds the distance from the axis M to the radially innermost points of the motion transmitting portions 35 and 35'. This ensures that, when the convex surface of the projection 27' bears against the convex surface of the motion transmitting portion 35 or 35', the peripheral surface of the split ring 34 is urged against the internal surface of the braking member 32 with a very large force which even further reduces the likelihood of slippage of the split ring 34 and the braking member 32 relative to each other. At least one of the three convex surfaces extends along an arc of at least 180 degrees (note the peripheral surface of the projection 27').

The just described feature that the projection 27' can urge the peripheral surface of the split ring 34 into a pronounced frictional engagement with the braking member 32 when the section 18 is acted upon by a force tending to change the inclination of the respective part 11 (not shown in FIGS. 5–6) of the seat relative to the section 17 renders it possible to install an antifriction ball or roller bearing 43 between the shaft 14 and the section 17 to reduce the effort which is required to turn the hand wheel 13 when the operator desires to change the inclination of the section 18. The bearing 43 surrounds the eccentric portion 19 of the shaft 14.

The shaft 14 comprises an extension 44 which is coaxial with the portions 20, 21 and is surrounded by a sleeve or hub 45. The hub 45 can rotate on the extension 44 and is rigid with the hand wheel 13. The connection between the hand wheel 13 and the hub 45 comprises a dished member 46 which is anchored in the hand wheel 13 in a manner not forming part of the invention.

The mode of operation of the hinge joint of FIGS. 5 and 6 is substantially identical to that of the hinge joint 12 of FIGS. 2 and 3.

The hinge joint of FIGS. 5 and 6 exhibits the advantage that the projection 27' of the blocking element 26 can urge the split ring 34 against the braking member 32 with a force which is much greater than the force which is generated by the projection 27 of the blocking element 26 in the hinge joint 12 of FIGS. 2 and 3. This is due to the fact that the relatively long projection 27 of the hinge joint 12 acts upon the adjacent motion transmitting portion 35 or 35' substantially tangentially of the internal surface of the braking member 32. On the other hand, the relatively short projection 27' of the blocking element 26 in the hinge joint of FIGS. 5 and 16 acts upon the portion 35 or 35' tangentially as well as substantially radially outwardly so that the peripheral surface of the split ring 34 is urged against the braking member 32 with a great force as soon as the section 18 tends to change its inclination with reference to the section 17 in response to the application of a force other than that produced by the hand wheel 13. This will be readily appreciated by bearing in mind that the radially outermost portion of the projection 27' is not immediately adjacent the internal surface of the braking member 32 and cooperates with the convex surface of the motion transmitting portion 35 or 35' in such a way that, when the blocking element 26 of FIGS. 5 and 6 tends to turn relative to the split ring 34, it invariably urges the portion 35 or 35' radially outwardly to thus maintain the corresponding end portion of the peripheral surface of the split ring 34 in strong frictional engagement with the braking member 32. The configuration and the dimensions of the projection 27' and motion transmitting portions 35, 35' can be readily selected in such a way that the force which acts upon the portion 35 or 35' in a direction radially outwardly is much greater than the force which acts upon the portion 35 or 35' in the tangential direction of the split ring 34.

The hinge joint of FIGS. 7 and 8 comprises an antifriction bearing 43 which is interposed between the eccentric portion 19 of the shaft 14 and the gear 30 on the fixedly mounted section 17. The braking member 32 is an integral part of a dished member 47 which is riveted or otherwise fixedly secured to the section 18. The bottom wall of the dished member 47 has a central opening for the concentric portion 21 of the shaft 14. The portion 21 has one or more flats surrounded by a complementary internal surface of the main portion of a blocking element 26. The main portion of the blocking element 26 is coplanar with the braking member 32 as well as with the split ring 34 of the brake shoe 33 within the braking member. The engaging portion or projection 27 of the blocking element 26 is a separately produced part including a wiper 48 having a socket for a rounded fulcrum 49 of the main portion of the blocking element 26. The wiper 48 is located between the motion transmitting portions 35, 35' of the split ring 34. The disengaging element of the coupling device in the locking means of the hinge joint which is shown in FIGS. 7 and 8 comprises two protuberances 37 and 37' which flank the portions 35, 35' of the split ring 34.

The purpose of the wiper 48, which is pivotable on the fulcrum 49 about an axis extending in parallelism with the axis of the shaft 14, is to further enhance the frictional engagement between the peripheral surface of the split ring 34 and the internal surface of the braking member 32 when the section 18 is acted upon by a force which tends to turn it about the axis of the shaft 14. Even a very minor pivotal movement of the wiper 48 relative to the main portion of the blocking element 26 will produce a so-called toggle effect upon the motion transmitting portion 35 or 35' of the split ring 34 so that the latter is maintained in a pronounced frictional engagement with the internal surface of the braking member 32 except when the hand wheel 13 is rotated clockwise or counterclockwise in order to effect an at least partial disengagement of the split ring 34 from the braking member 32 by way of the protuberance 37 or 37' of the coupling device and the associated motion transmitting portion 35 or 35′ of the split ring. The coupling device which includes the protuberances 37 and 37′ further comprises a disc 50 which is non-rotatably secured to the hub 45 for the hand wheel 13 on the extension 44 of the shaft 14. The disc 50 is rotatable on the extension 44.

Referring to FIG. 9, there is shown a portion of a hinge joint which comprises a brake shoe 33 consisting of a length of wire having inwardly bent motion transmitting end portions 35, 35′ at opposite sides of an engaging portion 52 in the form of a disc which is the projection of a two-piece blocking element 26′. The main portion of the blocking element 26′ is non-rotatably mounted on a concentric portion of the shaft 14 and such main portion has a concave seat 53 for the disc-shaped engaging portion or projection 52. The motion transmitting portions 35 and 35′ of the split ring which forms part of or constitutes the brake shoe 33 respectively have flat surfaces 51 and 51′ which extend tangentially of and contact the peripheral surface of the engaging portion 51 of the two-piece blocking element 26′. The surfaces 51 and 51′ diverge in a direction from the internal surface of the braking member toward the axis M of the shaft 14.

The motion transmitting portions 35, 35′ of the split ring are flanked by the protuberances 37, 37′ of the coupling device 36 which is non-rotatably connected with the hand wheel, not shown.

An advantage of the two-piece blocking element 26′ is that the disc-shaped engaging portion 52 can urge the peripheral surface of the brake shoe 33 against the internal surface of the braking member with a large force as soon as it is caused to bear upon the motion transmitting portion 35 or 35′. The effect is analogous to that of the two-piece blocking element including the wiper 48 of FIGS. 7 and 8.

The advantages of the hinge joints which are shown in FIGS. 7–8 and 9 are analogous to those of the hinge joint of FIGS. 5–6. Thus, the wiper 48 or the disc-shaped projection 52 also tends to move the adjacent motion transmitting portion 35 or 35′ radially outwardly to ensure the establishment of a very pronounced frictional engagement between the peripheral surface of the split ring and the internal surface of the braking member as soon as the wiper 48 or the disc 52 begins to bear upon the motion transmitting portion 35 or 35′ in response to the application of a force directly to the section 18.

The hinge joint which is shown in FIG. 10 is similar to that of FIGS. 5 and 6 except that the braking member 32′ has a frustoconical internal surface 54 in frictional engagement with a wire-like brake shoe including a split ring 34 of the type shown in FIGS. 4 and 9. When the prestressed split ring 34 is caused or permitted to expand, it is wedged between the frustoconical surface 54 of the braking member 32′ and the adjacent radially extending surface of the panel 31 (connected to the section 18) to even further reduce the likelihood of undesirable angular displacement of the section 18 with reference to the section 17, e.g., when a force is applied directly to the section 18 in a direction to turn this section about the axis of the shaft 14. The frustoconical surface 54 of the braking member 32′ diverges in a direction toward the adjacent radially extending surface of the panel 31. The braking member 32′ is welded or otherwise fixedly secured to the panel 31.

The mode of operation of the hinge joint of FIG. 10 is analogous to that of the previously described hinge joints.

FIGS. 11 and 12 show a further hinge joint wherein the locking means 15 and the means for rotating the shaft 14 together form a separately produced and assembled module which is mounted on an extension 56 of the shaft 14. The basic hinge joint 12 (including the sections 17, 18 and their mating gears 29, 30) and the locking means 15 are disposed side-by-side in the axial direction of the shaft 14. The eccentric portion 19 of the shaft 14 is a conical frustum and extends into a complementary opening (bounded by a frustoconical internal surface) of the section 17. The section 18 is welded to a panel 31 which has an opening for a bearing sleeve surrounding the concentric portion 20 of the shaft 14. The section 18 itself surrounds the concentric portion 21 of the shaft 14. The module includes a diaphragm spring 55 or an analogous spring which reacts against the section 18 and bears against a split ring or a shoulder on the shaft 14 to urge the latter axially in a direction to the right, as seen in FIG. 11, so as to urge the frustoconical eccentric portion 19 of the shaft 14 into the complementary opening of the section 17.

The extension 56 includes several portions with different diameters and is adjacent the concentric portion 21. The portions of the extension 56 include an externally toothed portion 57 in mesh with an internally toothed portion of a sleeve-like blocking element 26″. The latter is surrounded by a gear 58 which is freely rotatable thereon and forms part of the means 13 for rotating the shaft 14 for the purpose of changing the angular position of the section 18 with reference to the section 17. The rotating means 13 of FIGS. 11 and 12 is not a hand wheel; instead, the gear 58 of this rotating means is in mesh with a pinion (not shown) which can receive torque from a suitable motor. The motor is started to rotate the gear 58 clockwise or counterclockwise when the person in charge decides to change the inclination of the section 18 and of that part of the seat which is connected thereto. The blocking element 26″ is further surrounded by a bearing member 59 which includes a braking member 32′ with a frustoconical internal surface corresponding to the surface 54 of the braking member 32′ shown in FIG. 10 and being engaged by a wire-like split ring 34. The means for non-rotatably coupling the bearing member 59 and its braking member 32′ to the section 18 includes a bolt 60 which extends through a radially elongated slot of the bearing member 59 and is threadedly connected to the section 18.

The gear 58 of the rotating means 13 is non-rotatably connected with a coupling device 36′ which is mounted on the blocking element 26″ and has protuberances 37, 37′ flanking the motion transmitting end portions 35, 35′ of the split ring 34. The motion transmitting portions 35, 35′ define a gap for the projection 27 of the blocking element 26″.

When the aforementioned motor is started to rotate the gear 58 of the rotating means 13, the coupling device 36′ causes its protuberance 37 or 37′ to move the adjacent motion transmitting portion 35 or 35′ away from the frustoconical internal surface of the braking member 32′ so that the shaft 14 can be rotated through the medium of the blocking element 26″ and the mating gears 29, 30 cause the section 18 to change its inclination with reference to the section 17 of the hinge joint 12. When the motor is arrested, the split ring 34 expands and strongly engages the frustoconical internal surface of the braking member 32' to thus prevent any undesirable angular displacement of the section 18 relative to the section 17. The braking action is enhanced by the projection 27 of the blocking element 26" because such projection bears against the adjacent motion transmitting portion 35 or 35' as soon as the section 18 tends to turn with reference to the section 17.

The module of FIGS. 11 and 12 can be modified by providing it with a hand wheel in addition to or in lieu of the motor-driven gear 58. As a rule, or at least in many instances, a modular design of the locking device 15 will be selected if the shaft 14 is to be rotated by a motor.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A hinge joint, particularly for changing the mutual positions of two parts of a seat in a motor vehicle, comprising a first section connectable to the first part of a seat; a second section connectable to the second part of a seat; a shaft pivotably mounting said second section on said first section; means for rotating said shaft; a transmission interposed between said sections and operative to change the position of said second section with reference to said first section in response to rotation of said shaft; and means for locking said second section in a selected position with reference to said first section, including a braking member provided on one of said sections and having an internal surface, a resilient brake shoe including a flat radially expandible ring normally in frictional engagement with said internal surface and having two motion transmitting portions, a coupling device operatively connected with said rotating means and including a disengaging portion cooperating with said motion transmitting portions to reduce friction between said ring and said braking member in response to rotation of said shaft by said rotating means, and a blocking element provided on said shaft and having an engaging portion cooperating with said motion transmitting portions to urge said ring against said internal surface in response to application to said second section of a force tending to change the position of said second section and said shaft relative to said first section.

2. The joint of claim 1, wherein said ring is flat and is installed in said braking member in prestressed condition so that it normally bears against said internal surface.

3. The joint of claim 1, wherein the motion transmitting portions of said ring extend substantially radially inwardly and away from said internal surface.

4. The joint of claim 1, wherein said ring is a split ring, said motion transmitting portions constituting the end portions of said split ring and defining a gap therebetween.

5. The joint of claim 4, wherein said engaging portion includes a projection provided on said blocking element and disposed in said gap.

6. The joint of claim 5, wherein said disengaging portion includes two protuberances provided on said coupling device and flanking the end portions of said split ring.

7. The joint of claim 4, wherein said disengaging portion includes two protuberances provided on said coupling device and flanking the end portions of said split ring.

8. The joint of claim 1, wherein said ring has a polygonal cross-sectional outline.

9. The joint of claim 8, wherein said ring has a square or rectangular cross-sectional outline.

10. The joint of claim 1, wherein said ring is a split wire ring having two substantially radially inwardly bent end portions which constitute said motion transmitting portions.

11. The joint, of claim 10, wherein said ring has a constant cross-sectional diameter from end to end.

12. The joint of claim 1, wherein said ring is a split ring having two end portions which constitute said motion transmitting portions and define a gap for a projection provided on said blocking element and constituting said engaging portion, said end portions having convex surfaces adjacent said projection and said projection having a convex surface adjacent the surfaces of said end portions, the convex surfaces of said end portions being disposed at a first distance from the axis of said shaft and a portion of the convex surface of said projection being disposed at a second distance from the axis of said shaft, said second distance being slightly greater than said first distance.

13. The joint of claim 12, wherein at least one of said convex surfaces extends along an arc of approximately 180 degrees.

14. The joint of claim 1, wherein said fulcrum defines for said projection a pivot axis which is substantially parallel to the axis of said shaft.

15. The joint of claim 1, wherein said ring is a split ring having two end portions which constitute said motion transmitting portions and define a gap, said blocking element including a main portion provided on said shaft and having a concave seat adjacent said gap, said engaging portion including a rolling element interposed between said seat and said and portions.

16. The joint of claim 15, wherein said rolling element includes a disc and said end portions have surfaces disposed substantially tangentially of and contacting said disc.

17. The joint of claim 1, wherein ring has a substantially circular cross-sectional outline and said internal surface is a frustoconical surface.

18. The joint of claim 1, wherein said shaft has an extension and said locking means constitutes a prefabricated module which is mounted on said extension.

19. The joint of claim 18, wherein said rotating means forms part of said module.

20. A hinge joint, particularly for changing the mutual positions of two parts of a seat in a motor vehicle, comprising a first section connectable to the first part of a seat; a second section connectable to the second part of a seat; a shaft pivotably mounting said second section on said first section; means for rotating said shaft; a transmission interposed between said sections and operative to change the position of said second section with reference to said first section in response to rotation of said shaft; and means for locking said second section in a selected position with reference to said first section, including a braking member provided on one of said sections and having an internal surface, a resilient brake shoe including a radially expandible ring normally in frictional engagement with said internal surface and having end portions constituting motion transmitting portions and defining a gap, a coupling device operatively connected with said rotating means and including a disengaging portion cooperating with said motion transmitting portions to reduce friction between said ring and said braking member in response to rotation of said shaft by said rotating means, and a blocking element including a main portion provided on said shaft and having an engaging portion cooperating with said motion transmitting portions to urge said ring against said internal surface in response to application to said second section of a force tending to change the position of said second section and said shaft relative to said first section, said blocking element further having a fulcrum provided on said main portion for said engaging portion and said engaging portion including a projection in said gap.

* * * * *